US012472779B2

(12) United States Patent
Nakata et al.

(10) Patent No.: US 12,472,779 B2
(45) Date of Patent: Nov. 18, 2025

(54) TIRE

(71) Applicant: BRIDGESTONE CORPORATION, Tokyo (JP)

(72) Inventors: Yoshiki Nakata, Tokyo (JP); Mayuko Karasawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 358 days.

(21) Appl. No.: 17/997,040

(22) PCT Filed: May 6, 2021

(86) PCT No.: PCT/JP2021/017413
§ 371 (c)(1),
(2) Date: Oct. 25, 2022

(87) PCT Pub. No.: WO2021/225145
PCT Pub. Date: Nov. 11, 2021

(65) Prior Publication Data
US 2023/0173850 A1 Jun. 8, 2023

(30) Foreign Application Priority Data

May 8, 2020 (JP) ................................. 2020-082604
May 8, 2020 (JP) ................................. 2020-082611

(51) Int. Cl.
B60C 11/13 (2006.01)
B60C 11/03 (2006.01)
B60C 11/12 (2006.01)

(52) U.S. Cl.
CPC .......... B60C 11/13 (2013.01); B60C 11/0302 (2013.01); B60C 11/0304 (2013.01);
(Continued)

(58) Field of Classification Search
CPC . B60C 11/032; B60C 11/0304; B60C 11/033; B60C 11/12; B60C 11/0307;
(Continued)

(56) References Cited

U.S. PATENT DOCUMENTS 10,195,905 B2 2/2019 Kato
10,744,824 B2 8/2020 Akashi
(Continued)

FOREIGN PATENT DOCUMENTS

CN 102448742 A 5/2012
CN 105283326 A 1/2016
(Continued)

OTHER PUBLICATIONS

Nov. 24, 2023, search result of Office Action issued by the China National Intellectual Property Administration in the corresponding Chinese Patent Application No. 202180033577.0.
(Continued)

Primary Examiner — Justin R Fischer
Assistant Examiner — Philip N Schwartz
(74) Attorney, Agent, or Firm — KENJA IP LAW PC

(57) ABSTRACT

A tire includes a first circumferential main groove 11 and a second circumferential main groove 12 in a tread surface 1. A resonator 21 is formed in an intermediate land portion 20 partitioned between the first circumferential main groove and the second circumferential main groove. The resonator has an auxiliary groove 211 whose both ends terminate within the intermediate land portion. The groove depths D1 of the first and second circumferential main grooves are 50% or less of the groove widths W2 of the first and second circumferential main grooves, respectively. The groove depth D3 of the auxiliary groove of the resonator is 70% or more of the groove depth D1 of the first circumferential main groove.

23 Claims, 6 Drawing Sheets

(52) U.S. Cl.
CPC ...... *B60C 11/1218* (2013.01); *B60C 11/1236* (2013.01); *B60C 2011/0353* (2013.01); *B60C 2011/0355* (2013.01); *B60C 2011/0367* (2013.01); *B60C 2011/1209* (2013.01)

(58) Field of Classification Search
CPC ..... B60C 2011/0033; B60C 2011/0344; B60C 2011/0348; B60C 2011/0353; B60C 2011/0355
See application file for complete search history.

(56) References Cited

U.S. PATENT DOCUMENTS

| | | | |
|---|---|---|---|
| 11,498,370 | B2 | 11/2022 | Tomida |
| 2010/0175799 | A1* | 7/2010 | Takahashi ............... B60C 11/13 152/209.3 |
| 2012/0067479 | A1 | 3/2012 | Waki et al. |
| 2022/0024261 | A1 | 1/2022 | Kawashima |

FOREIGN PATENT DOCUMENTS

| | | | | |
|---|---|---|---|---|
| CN | 105307873 | A | | 2/2016 |
| EP | 2990230 | A1 | | 3/2016 |
| JP | 2007269144 | A | * | 10/2007 ........... B60C 11/032 |
| JP | 2008179289 | A | * | 8/2008 |
| JP | 2008213596 | A | | 9/2008 |
| JP | 2009001204 | A | | 1/2009 |
| JP | 2009090740 | A | | 4/2009 |
| JP | 2011140268 | A | * | 7/2011 |
| JP | 2011143897 | A | * | 7/2011 |
| JP | 2012171578 | A | * | 9/2012 |
| JP | 2013086683 | A | | 5/2013 |
| JP | 2013133084 | A | | 7/2013 |
| JP | 2015098325 | A | | 5/2015 |
| JP | 2015214303 | A | | 12/2015 |
| JP | 2016007973 | A | | 1/2016 |
| WO | 2019117091 | A1 | | 6/2019 |
| WO | 2020111156 | A1 | | 6/2020 |

OTHER PUBLICATIONS

Oct. 19, 2023, search result of the Extended European Search Report issued by the European Patent Office in the corresponding European Patent Application No. 21800670.8.

Jun. 30, 2024, search result of Office Action issued by the China National Intellectual Property Administration in the corresponding Chinese Patent Application No. 202180033577.0.

Jun. 22, 2021, International Search Report issued in the International Patent Application No. PCT/JP2021/017413.

Nov. 8, 2022, International Preliminary Report on Patentability issued in the International Patent Application No. PCT/JP2021/017413.

* cited by examiner

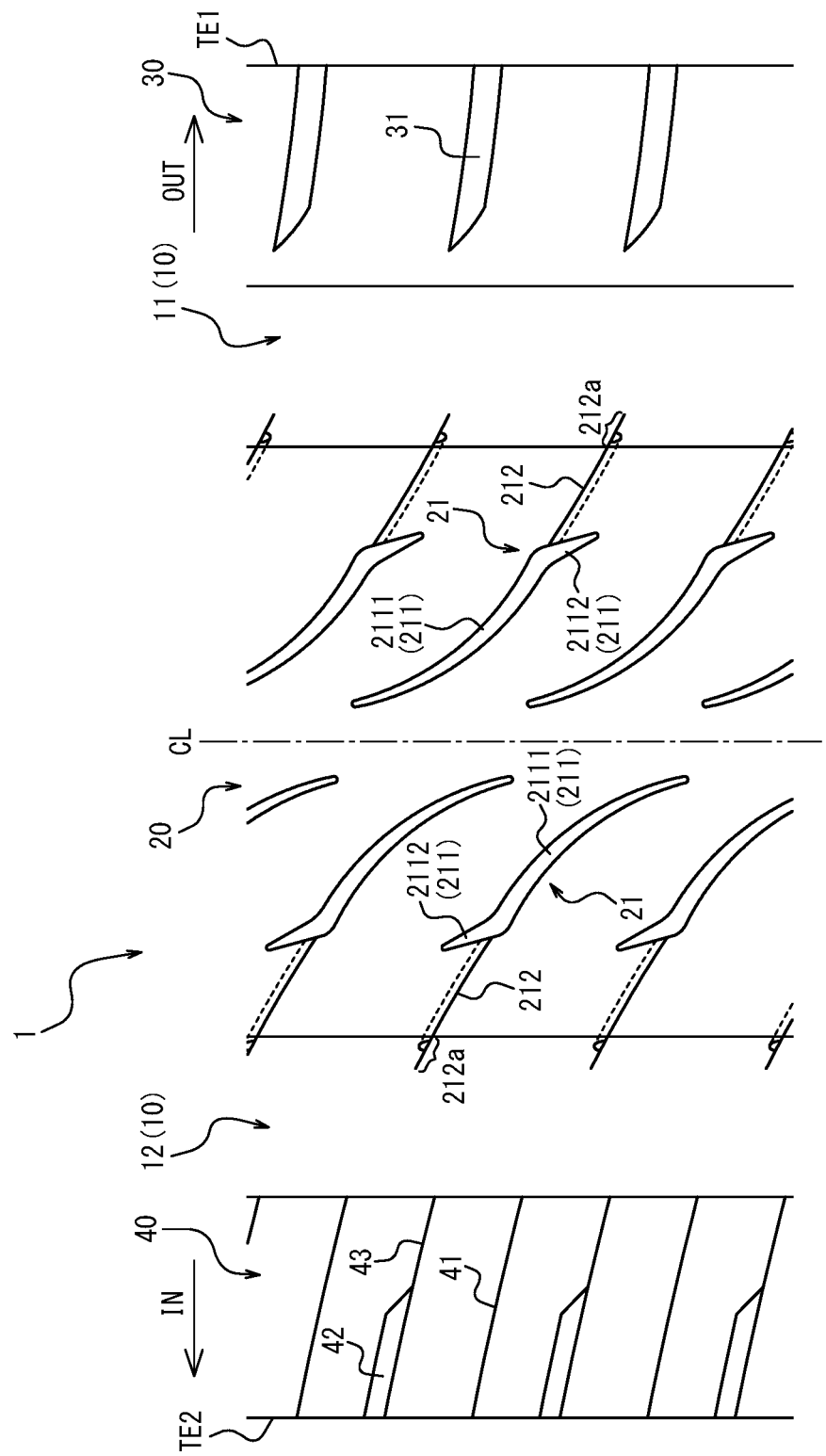

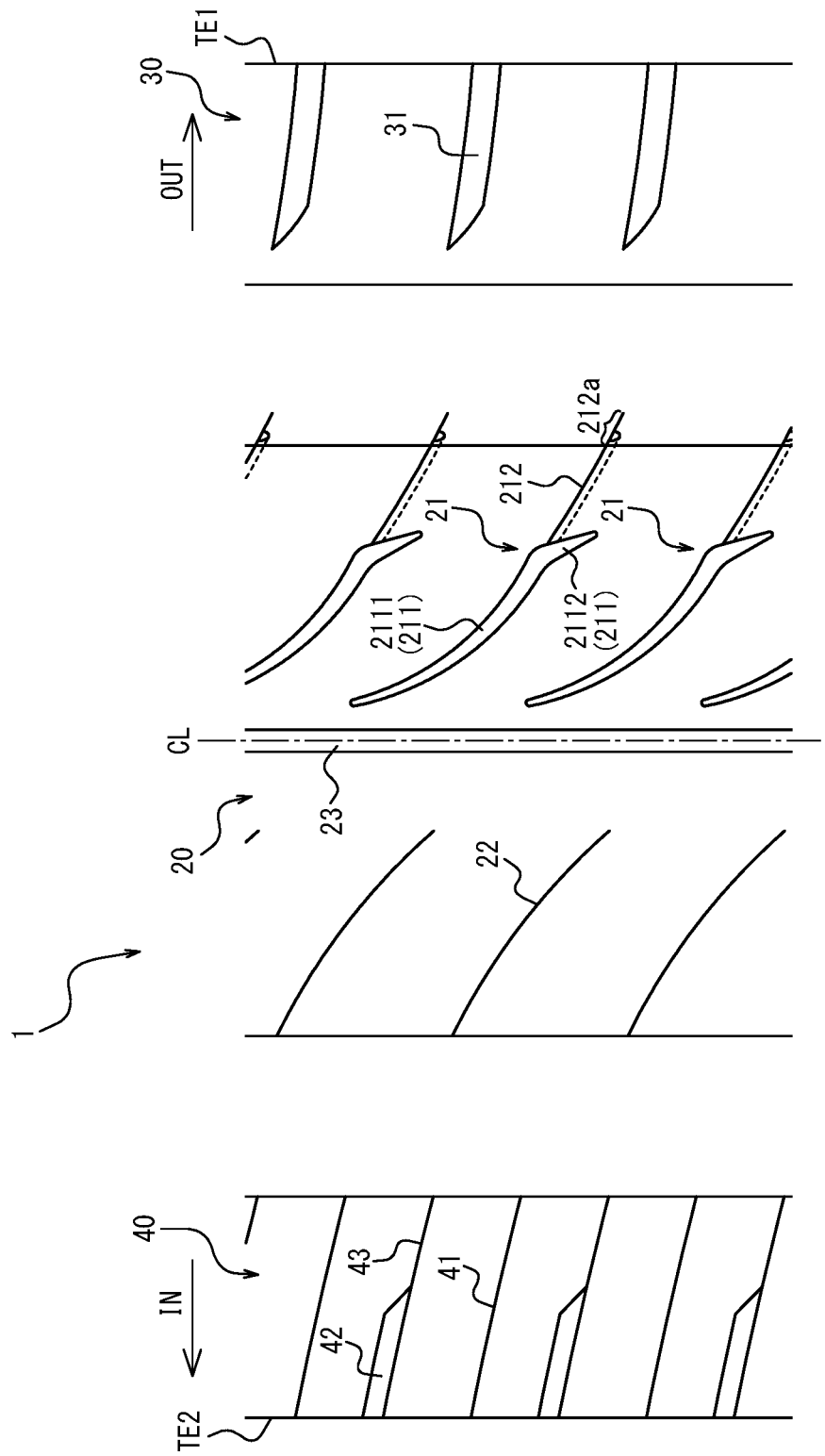

TIRE

TECHNICAL FIELD

The present disclosure relates to a tire.

BACKGROUND

There are tires with multiple circumferential main grooves on a tread surface (for example, Patent Literature (PTL) 1).

This application claims priority to Japanese Patent Application Nos. 2020-082604 and 2020-082611, filed on May 8, 2020, the entire contents of which are hereby incorporated herein by reference.

CITATION LIST

Patent Literature

PTL 1: JP 2016-7973 A

SUMMARY

Technical Problem

Conventional tires as described above generally have deep circumferential main grooves and, thus thick tread rubber. This is undesirable from the viewpoint of reduction in tire weight and rolling resistance.

The inventors of the present disclosure have newly noticed that when the groove depths of the circumferential main grooves are made shallower and thus the thickness of the tread rubber is made thinner, noise tends to increase, though reduction in tire weight and rolling resistance can be expected, and achieved the present disclosure.

It would be helpful to provide a tire in which increase in noise can be suppressed, while the groove depths of circumferential main grooves are made shallow.

Solution to Problem

A tire according to the present disclosure is a tire including a first circumferential main groove and a second circumferential main groove in a tread surface,
wherein
a resonator is formed in an intermediate land portion partitioned between the first circumferential main groove and the second circumferential main groove,
the resonator includes an auxiliary groove whose both ends terminate within the intermediate land portion,
the groove depths D1 of the first and second circumferential main grooves are 50% or less of the groove widths W2 of the first and second circumferential main grooves, respectively, and
the groove depth D3 of the auxiliary groove of the resonator is 70% or more of the groove depth D1 of the first circumferential main groove.

Advantageous Effect

According to the present disclosure, it is possible to provide a tire in which increase in noise can be suppressed, while the groove depths of circumferential main grooves are made shallow.

BRIEF DESCRIPTION OF THE DRAWINGS

In the accompanying drawings:

FIG. 5 is a development view of a tread surface of a tire according to a first variation of the present disclosure, as developed on a flat surface; and FIG. 6 is a development view of a tread surface of a tire according to a second variation of the present disclosure, as developed on a flat surface.

DETAILED DESCRIPTION

Figure 1:
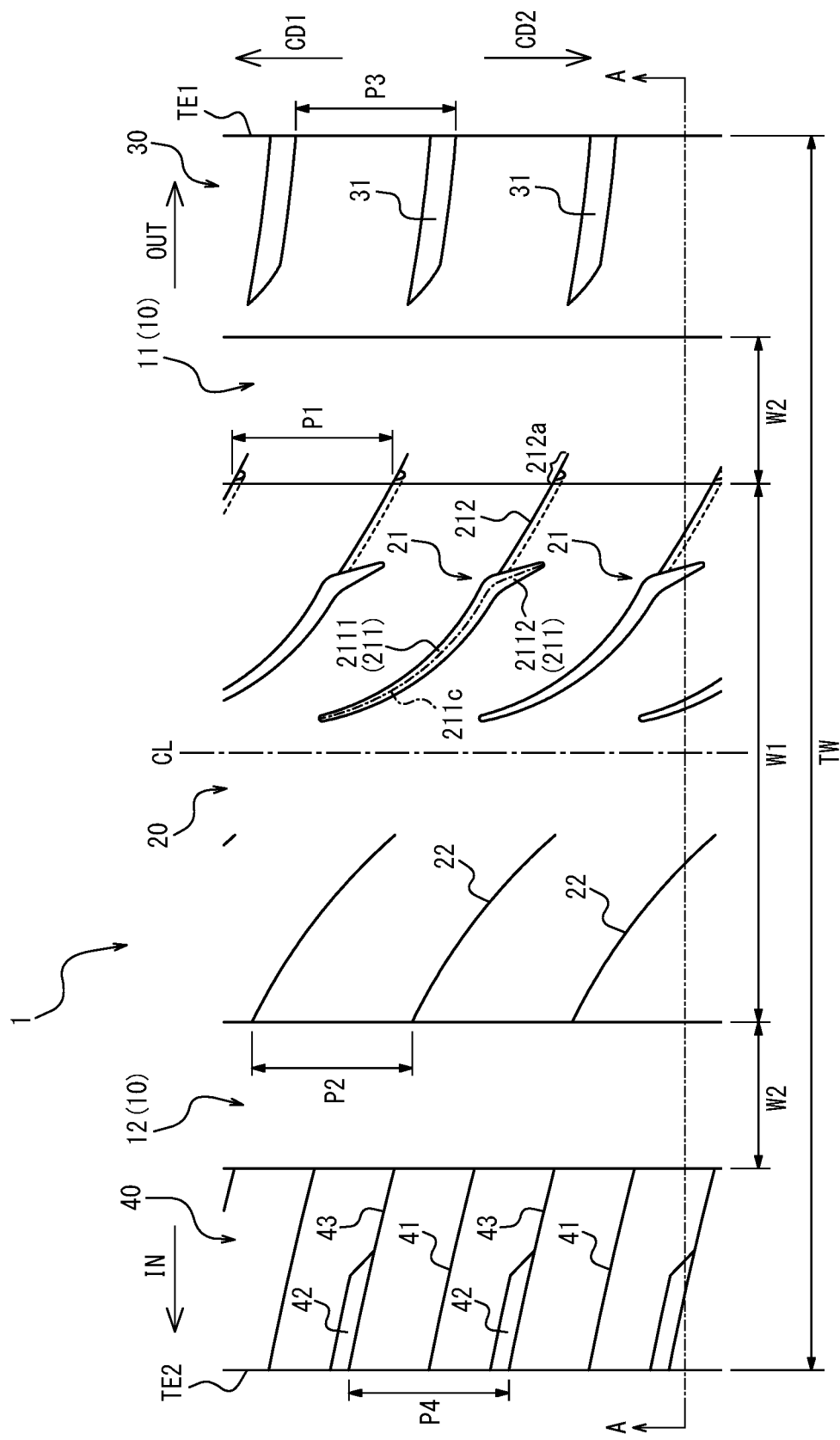
FIG. 1 is a development view of a tread surface of a tire according to an embodiment of the present disclosure, as developed on a flat surface.

A tire according to the present disclosure can be used as any type of pneumatic tire, but is suitably used as a pneumatic tire for passenger vehicles.

Embodiments of the tire according to the present disclosure will be exemplarily described below with reference to the drawings. In each of the drawings, the same reference numerals refer to common components.

A tire according to each example described in this specification includes a tread portion 90 (FIG. 3), a pair of shoulder portions (not illustrated) extending inward in a tire radial direction from both ends of the tread portion 90 in a tire width direction, and a pair of bead portions (not illustrated) connected inward in the tire radial direction from the pair of shoulder portions.

Figure 3:
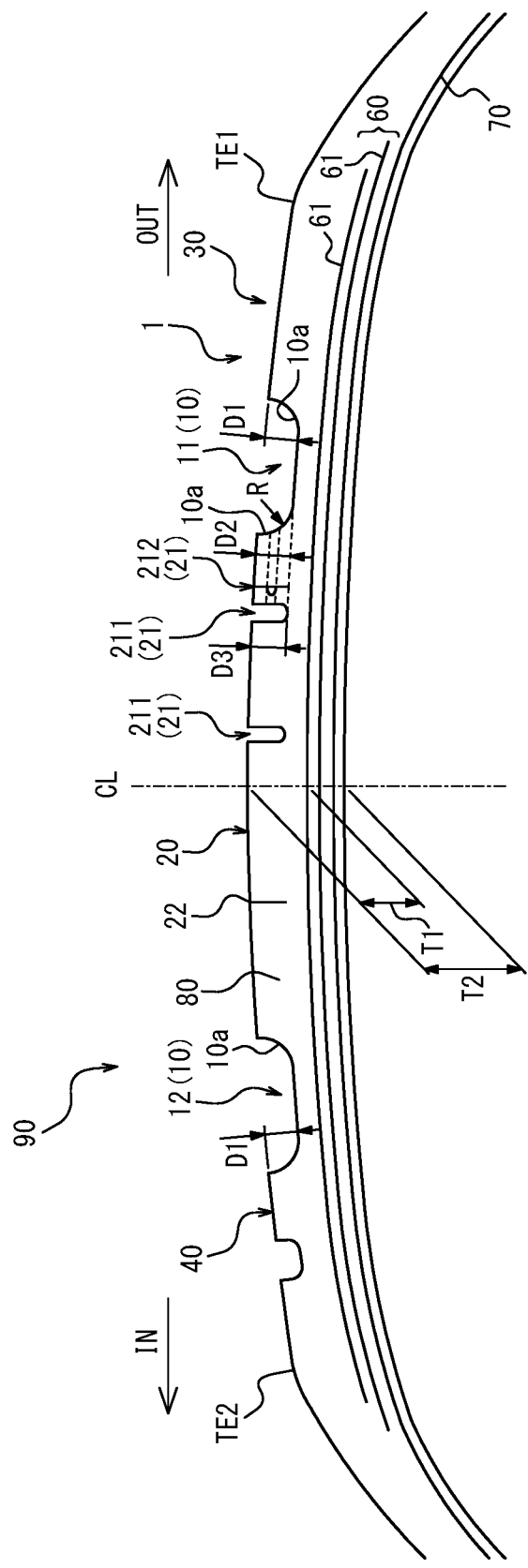
FIG. 3 is a cross-sectional view in a tire width direction, illustrating a part of the tire of FIG. 1 in cross-section along the line A-A of FIG. 1.

The tire according to each example described in this specification may have any internal configuration. The tire according to each example described in this specification may, for example, include a pair of bead cores (not illustrated) provided at the pair of bead portions, a pair of bead fillers (not illustrated) located outside the bead cores in the tire radial direction, a carcass 70 (FIG. 3), a belt 60 (FIG. 3), and tread rubber 80 (FIG. 3). The carcass 70 extends in a toroidal shape between the pair of bead cores. The carcass 70 includes at least one layer (one layer in the example of the drawing) of carcass ply. The carcass ply of the carcass 70 can, for example, be constituted of cords made of steel, organic fibers, or the like coated with rubber. The carcass 70 can, for example, include a body portion extending in a toroidal shape between the pair of bead cores, and a pair of turn-up portions turned up outward in the tire width direction around the bead cores from an innermost end of the body portion in the tire radial direction at each of both sides relative to a tire equatorial plane CL. The belt 60 is positioned, in the tread portion 90, outside in the tire radial direction relative to a crown region of the carcass 70 (FIG. 3). The belt 60 is constituted of at least one belt layer 61 (two layers in the example of the drawing). The belt layer 61 can be, for example, constituted of cords made of steel, organic fibers, or the like covered by rubber. The tread rubber 80 is disposed outside the belt 60 in the tire radial direction.

A tire according to an embodiment of the present disclosure will be described with reference to FIGS. 1 to 4.

Figure 2:
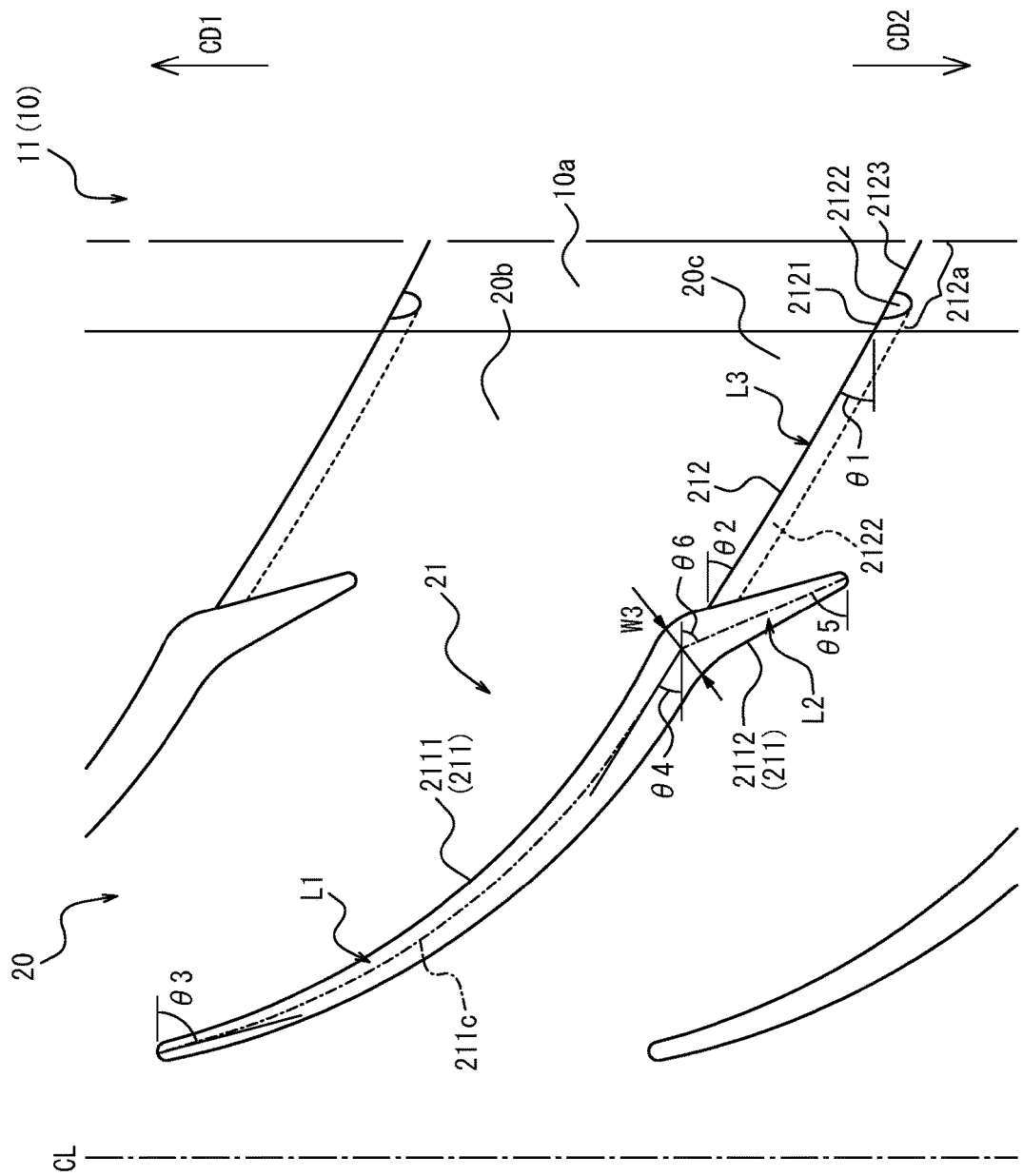
FIG. 2 is an enlarged view of a part of FIG. 1.
Figure 4:
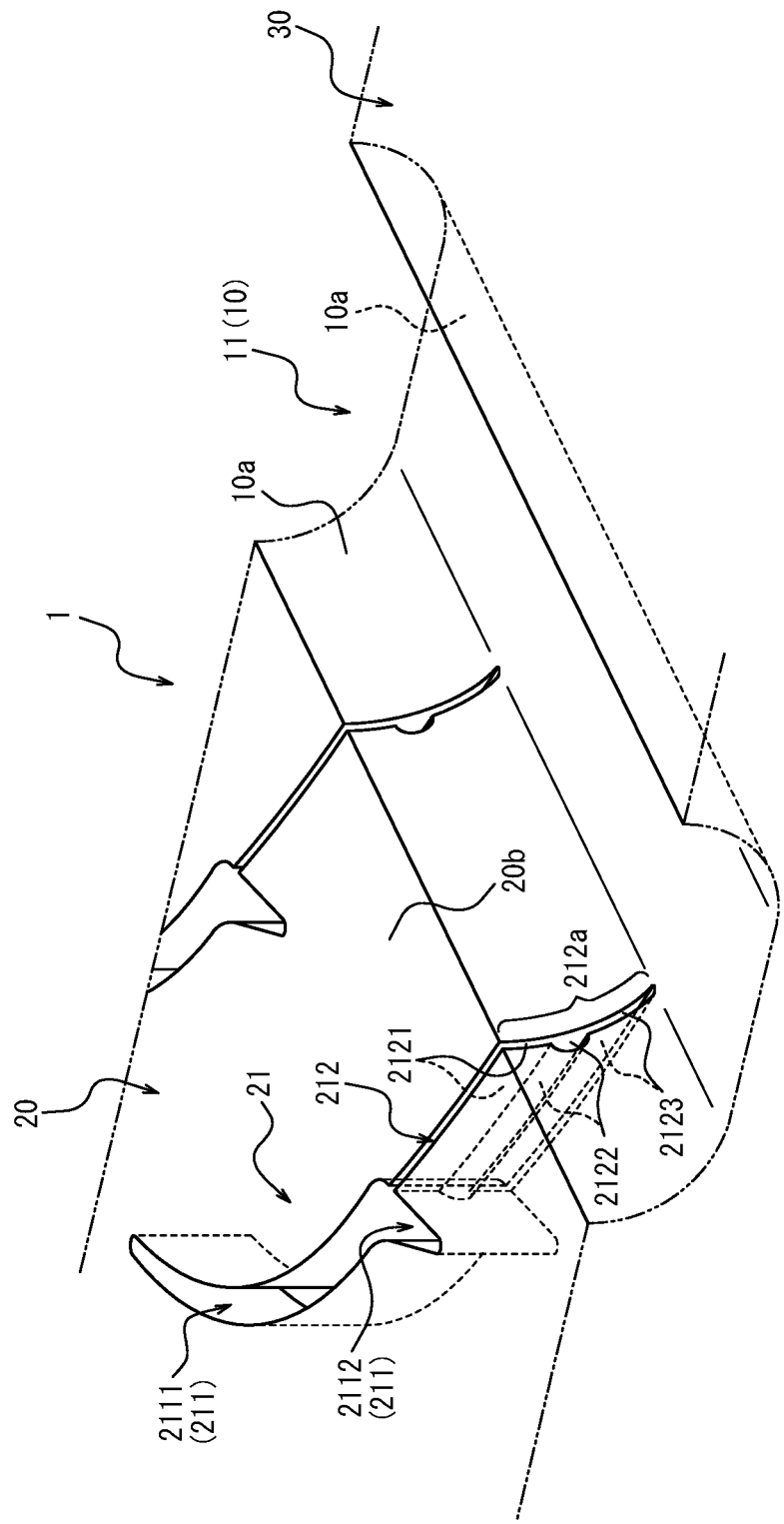
FIG. 4 is a perspective view illustrating a part of the tire of FIG. 1 with enlargement.

FIG. 1 is a development view of a tread surface 1 of the tire according to the embodiment of the present disclosure, as developed on a flat surface. FIG. 2 is an enlarged view of a part of FIG. 1. FIG. 3 is a cross-sectional view in a tire width direction, illustrating a portion of the tire of FIG. 1 in cross-section along the line A-A of FIG. 1. FIG. 4 is a perspective view illustrating a part of the tire of FIG. 1 with enlargement.

The tire according to an example of FIG. 1 is a tire whose mounting direction to a vehicle is specified. In FIG. 1, the direction of the arrow OUT indicates a direction of outside (hereinafter referred to as "vehicle-mounted outside") in a vehicle width direction when the tire is mounted on the vehicle. The direction of the arrow IN indicates a direction of inside (hereinafter referred to as "vehicle-mounted inside") in the vehicle width direction when the tire is mounted on the vehicle. In the tread surface 1 of this tire, a tread pattern that is asymmetrical with respect to a tire equatorial plane CL is provided.

However, the tire according to each example described in this specification may be a tire whose mounting direction to a vehicle is not specified. A tread pattern of the tire according to each example described in this specification may be asymmetrical with respect to a tire equatorial plane CL or symmetrical with respect to the tire equatorial plane CL.

For convenience, the upper side of FIG. 1 is referred to as "first tire circumferential side (CD1)" and the lower side of FIG. 1 as "second tire circumferential side (CD2)" in this specification.

In this specification, "tread surface (1)" means an outer circumferential surface over an entire circumference of the tire that comes into contact with a road surface when the tire mounted on a rim and filled with a specified internal pressure is rolled under a maximum load.

In this specification, "ground contact edge (TE1, TE2)" refers to an end of the tread surface (1) in the tire width direction.

In this specification, "rim" means a standard rim (Measuring Rim in ETRTO's STANDARDS MANUAL and Design Rim in TRA's YEAR BOOK) in an applicable size as described in or to be described in an industrial standard valid for regions where tires are produced and used, such as JATMA YEAR BOOK of the JATMA (The Japan Automobile Tyre Manufacturers Association, Inc.) in Japan, STANDARDS MANUAL of the ETRTO (The European Tyre and Rim Technical Organisation) in Europe, YEAR BOOK of TRA (The Tire and Rim Association, Inc.) in the United States, and the like (in other words, the above-described "rim" includes sizes that may be included in the aforementioned industrial standards in the future, as well as current sizes. Examples of the "sizes to be included in the future" may be sizes listed as "FUTURE DEVELOPMENTS" in the 2013 edition of STANDARDS MANUAL of the ETRTO.), but in the case of a size not listed in these industrial standards, a rim with a width corresponding to a bead width of tires.

In this specification, "specified internal pressure" refers to an air pressure (maximum air pressure) corresponding to a maximum load capacity of a single wheel in the applicable size and ply rating described in the aforementioned JATMA YEAR BOOK or other industrial standards. In the case of sizes not listed in the aforementioned industrial standards, the "specified internal pressure" refers to an air pressure (maximum air pressure) corresponding to a maximum load capacity specified for each vehicle on which the tire is mounted.

"Maximum load" means a load corresponding to the maximum load capacity described above.

Air here can be replaced by inert gas such as nitrogen gas, or the like.

In this specification, unless otherwise noted, the dimensions of each of elements such as grooves and lands, a ground contact width (TW), and the like are measured in "standard condition" described below.

In this specification, the "standard condition" refers to a condition in which the tire is mounted on the rim, filled with the above specified internal pressure, and unloaded. Here, the dimensions of each of the elements in the tread surface such as the grooves and the lands, the ground contact width (TW), and the like are measured on a development view of the tread surface.

The tire according to each example described in this specification has at least two (in the example of FIG. 1, only two) circumferential main grooves 10 on the tread surface 1, as illustrated in FIG. 1. The tire according to each example described in this specification is provided with at least a first circumferential main groove 11 and a second circumferential main groove 12, as the circumferential main grooves 10. Between at least the two circumferential main grooves 10 described above, one or more intermediate land portions 20 are partitioned. That is, the intermediate land portion 20 is partitioned between the first and second circumferential main grooves 11 and 12.

In the example of FIG. 1, a first end land portion 30 is partitioned between the first circumferential main groove 11 and a first ground contact edge TE1. In the example of FIG. 1, a second end land portion 40 is partitioned between the second circumferential main groove 12 and a second ground contact edge TE2.

Each of the intermediate land portion 20, the first end land portion 30, and the second end land portion 40 is not divided by transverse grooves (excluding sipes) in a tire circumferential direction, but are continuous in the tire circumferential direction over the entire tire in the tire circumferential direction, i.e., rib-like land portions.

In the example in FIG. 1, the first circumferential main groove 11, the first ground contact edge TE1, and the first end land portion 30 are located on the vehicle-mounted outside (OUT side) with respect to the tire equatorial plane CL. The second circumferential main groove 12, the second ground contact edge TE2, and the second end land portion 40 are located on the vehicle-mounted inside (IN side) with respect to the tire equatorial plane CL. The intermediate land portion 20 is located on the tire equatorial plane CL. However, the first ground contact edge TE1 and the first end land portion 30 may be located on the vehicle-mounted inside (IN side) with respect to the tire equatorial plane CL, and the second ground contact edge TE2 and the second end land portion 40 may be located on the vehicle-mounted outside (OUT side). The first circumferential main groove 11 and the second circumferential main groove 12 may be located on either side with respect to the tire equatorial plane CL. For example, the second circumferential main groove 12 may be located on the vehicle-mounted outside (OUT side) with respect to the tire equatorial plane CL, and the first circumferential main groove 11 may be located on the vehicle-mounted inside (IN side) with respect to the tire equatorial plane CL. The first and second circumferential main grooves 11 and 12 may be located on opposite sides to each other with respect to the tire equatorial plane CL, as in the example of FIG. 1, or may be located on the same side as each other with respect to the tire equatorial plane CL. The intermediate land portion 20 may be located on the tire equatorial plane CL, as in the example of FIG. 1, or may not be located on the tire equatorial plane CL.

In the tire according to each example described in this specification, maximum values of the groove depths D1 (FIG. 3) of the circumferential main grooves 10 (in the example of FIG. 1, the first and second circumferential main grooves) provided in the tread surface 1 are 50% or less of the groove widths W2 (FIG. 1) of the circumferential main grooves 10 (in the example of FIG. 1, the first and second circumferential main grooves), respectively.

Therefore, in the tire according to each example described in this specification, the groove depths D1 (FIG. 3) of the circumferential main grooves (in the example of FIG. 1, the first and second circumferential main grooves) provided in the tread surface 1 are shallower than those of conventional general tires.

In each example described in this specification, as illustrated in FIGS. 1 to 4, a plurality of resonators 21 are formed in the intermediate land portion 20 partitioned between the first circumferential main groove 11 and the second circumferential main groove 12. Each resonator 21 has an auxiliary groove 211. It is preferable that the resonator 21 further have a branch groove 212. Both ends of the auxiliary groove 211 terminate within the intermediate land portion 20. The branch groove 212 extends so as to connect between the auxiliary groove 211 and the first circumferential main groove 11, and the groove cross-sectional area of the branch groove 212 is smaller than that of the auxiliary groove 211.

Here, the "groove cross-sectional area" of each of the branch groove 212, the branch groove 212, and the like is measured in the "standard condition" described above along a virtual plane perpendicular to a groove width centerline of each of the grooves.

In each example described in this specification, as described above, the maximum values of the groove depths D1 (FIG. 3) of the circumferential main grooves 10 (in the example of FIG. 1, the first and second circumferential main grooves) provided in the tread surface 1 are 50% or less of the groove widths W2 (FIG. 1) of the circumferential main grooves 10 (in the example of FIG. 1, the first and second circumferential main grooves), respectively, that is, are shallower than those of conventional general tires. Thus, the thickness T1 (FIG. 3) of the tread rubber 80 of the tire can be thinner than those of conventional general tires. This makes it possible to reduce the weight of the tire and the rolling resistance of the tire. In recent years, with the shift to eco-cars such as electric vehicles (EVs) and plug-in hybrid electric vehicles (PHEVs), a demand for reduction in the weight of car parts has been increasing, and a demand for reduction in the weight of tires is also increasing. In addition, there is a growing demand for reduced rolling resistance, as environmental regulations such as Europe's R117, for example, increasingly strictly regulate the rolling resistance of tires. The tire according to each example described in this specification can meet these requirements.

On the other hand, by simply making each circumferential main groove 10 shallower, as described above, and thus making the thickness T1 (FIG. 3) of the tread rubber 80 thinner, the rigidity of the tire increases and vibration is transmitted more easily, so that input from a road surface becomes stronger during rolling of the tire and noise (in particular, passing noise) tends to be generated more easily. Therefore, in the tire according to each example described in this specification, as described above, the resonators 21 are formed in the intermediate land portion 20 partitioned between the first and second circumferential main grooves 11 and 12. By forming the resonator 21, during rolling of the tire, air flowing in the first circumferential main groove 11 flows into the resonator 21, thereby dispersing a frequency and reducing noise. This reduces increase in noise (passing noise) owing to the shallowness of each circumferential main groove 10. In addition, environmental regulations such as R117 in Europe, for example, have become stricter in regulating tire noise, and a demand for reduction in noise is also increasing. The tire according to each example described in this specification can meet such a demand.

As described above, according to the tire of each example described in this specification, noise can be suppressed, while the groove depths of the circumferential main grooves are made shallow.

A suitable configuration, variations, and the like will be described below in the tire according to each example described in this specification.

In the tire according to each example described in this specification, the maximum values of the groove depths D1 (FIG. 3) of the circumferential main grooves 10 (in the example of FIG. 1, the first and second circumferential main grooves) are more preferably 45% or less of the groove widths W2 (FIG. 1) of the circumferential main grooves 10 (in the example of FIG. 1, the first and second circumferential main grooves), respectively. This allows the groove depths of the circumferential main grooves to be shallower. Thus, the thickness T1 (FIG. 3) of the tread rubber 80 can be made thinner, making it easier to reduce the tire weight and rolling resistance.

Similarly, from the viewpoint of making the groove depths of the circumferential main grooves shallower, the maximum value of the groove depth D1 (FIG. 3) of each of the circumferential main grooves 10 (in the example in FIG. 1, the first and second circumferential main grooves) is preferably 6.5 mm or less, and more preferably 6.0 mm or less.

Similarly, from the viewpoint of making the groove depths of the circumferential main grooves shallower, the maximum value of the groove depth D1 (FIG. 3) of each of the circumferential main grooves 10 (in the example of FIG. 1, the first and second circumferential main grooves) is preferably 80% or less of the thickness T1 (FIG. 3) of the tread rubber 80, and more preferably 75% or less.

On the other hand, in the tire according to each example described in this specification, minimum values of the groove depths D1 (FIG. 3) of the circumferential main grooves 10 (in the example of FIG. 1, the first and second circumferential main grooves) are preferably 20% or more of the groove widths W2 (FIG. 1) of the circumferential main grooves 10 (in the example of FIG. 1, the first and second circumferential main grooves), and more preferably 25% or more, respectively. This improves drainage.

Similarly, from the viewpoint of drainage, the minimum value of the groove depth D1 (FIG. 3) of each of the circumferential main grooves 10 (in the example in FIG. 1, the first and second circumferential main grooves) is preferably 5.0 mm or more, and more preferably 5.5 mm or more.

Similarly, from the viewpoint of drainage, the minimum value of the groove depth D1 (FIG. 3) of each of the circumferential main grooves 10 (in the example of FIG. 1, the first and second circumferential main grooves) is preferably 65% or more of the thickness T1 (FIG. 3) of the tread rubber 80, and more preferably 75% or more.

The groove depth D1 of each of the circumferential main grooves 10 may be constant along the tire circumferential direction or may vary along the tire circumferential direction.

Here, the "maximum value of the groove depth (D1) of each of the circumferential main grooves (10)" refers to a groove depth (D1) at a portion at which the groove depth (D1) of each of the circumferential main grooves (10) is maximized. The "minimum value of the groove depth (D1) of each of the circumferential main grooves (10)" refers to a groove depth (D1) at a portion at which the groove depth (D1) of each of the circumferential main grooves (10) is minimized.

In the tire according to each example described in this specification, the groove width W2 (FIG. 1) of each of the circumferential main grooves 10 (in the example in FIG. 1, the first and second circumferential main grooves) is preferably 5% or more of the ground contact width TW. This improves drainage.

Similarly, from the viewpoint of drainage, the groove width W2 (FIG. 1) of each of the circumferential main grooves 10 (in the example in FIG. 1, the first and second circumferential main grooves) is preferably 10 mm or more.

On the other hand, in the tire according to each example described in this specification, the groove width W2 (FIG. 1) of each of the circumferential main grooves 10 (in the example in FIG. 1, the first and second circumferential main grooves) is preferably 15% or less of the ground contact width TW. This ensures sufficient rigidity.

Similarly, from the viewpoint of rigidity, the groove width W2 (FIG. 1) of each of the circumferential main grooves 10 (in the example in FIG. 1, the first and second circumferential main grooves) is preferably 20 mm or less.

These ranges of the groove width W2 are particularly preferable in a case in which the number of the circumferential main grooves 10 provided in the tread surface 1 is two.

In this specification, the "ground contact width (TW)" means the distance between the pair of ground contact edges (TE1, TE2) in the tire width direction, measured along the tread surface 1.

In the tire according to each example described in this specification, a maximum value of the thickness T1 (FIG. 3) of the tread rubber 80 is preferably 8 mm or less. This enables reduction in tire weight and rolling resistance.

Similarly, from the viewpoint of reduction in tire weight and rolling resistance, the maximum value of the thickness T1 (FIG. 3) of the tread rubber 80 is preferably 70% or less of a maximum value of a gauge T2 (FIG. 3) of the tread portion 90.

On the other hand, in the tire according to each example described in this specification, the maximum value of the thickness T1 (FIG. 3) of the tread rubber 80 is preferably 6 mm or more. This improves the handling stability performance and ride comfort performance of the tire.

Similarly, from the viewpoint of handling stability performance and ride comfort performance, the maximum value of the thickness T1 (FIG. 3) of the tread rubber 80 is preferably 50% or more of the maximum value of the gauge T2 (FIG. 3) of the tread portion 90.

Here, the "maximum value of the thickness (T1) of the tread rubber (80)" refers to a thickness (T1) at a portion at which the thickness (T1) of the tread rubber (80) is maximized. The "maximum value of the gauge (T2) of the tread portion (90)" refers to a gauge (T2) at a portion at which the gauge (T2) of the tread portion (90) is maximized.

In the tire according to each example described in this specification, a maximum value of the groove width W3 (FIG. 2) of the auxiliary groove 211 of the resonator 21 is preferably 80% or less of a maximum value of the groove depth D3 (FIG. 3) of the auxiliary groove 211, and more preferably 60% or less of the maximum value of the groove depth D3 (FIG. 3) of the auxiliary groove 211. The provision of the resonator 21, as described above, makes it possible to suppress increase in noise, which can be caused by making the circumferential main grooves 10 shallower. By making the groove width W3 (FIG. 2) of the auxiliary groove 211 of the resonator 21 narrower, the rigidity of the tread portion 90 (in particular, the intermediate land portion 20) can be increased, thereby reduction in the rigidity of the tread portion 90 (in particular, the intermediate land portion 20), which is caused by the provision of the resonators 21 can be suppressed.

Similarly, from the viewpoint of rigidity, the maximum value of the groove width W3 (FIG. 2) of the auxiliary groove 211 of the resonator 21 is preferably 3.0 mm or less.

Similarly, from the viewpoint of rigidity, the maximum value of the groove width W3 (FIG. 2) of the auxiliary groove 211 of the resonator 21 is preferably 80% or less of the maximum value of the groove depth D1 (FIG. 3) of the first circumferential main groove 11, and more preferably 60% or less of the maximum value of the groove depth D1 (FIG. 3) of the first circumferential main groove 11.

On the other hand, in the tire according to each example described in this specification, the maximum value of the groove width W3 (FIG. 2) of the auxiliary groove 211 of the resonator 21 is preferably 15% or more of the maximum value of the groove depth D3 (FIG. 3) of the auxiliary groove 211. This improves noise reduction performance of the resonator 21.

Similarly, from the viewpoint of noise reduction performance, the maximum value of the groove width W3 (FIG. 2) of the auxiliary groove 211 of the resonator 21 is preferably 1.0 mm or more.

Similarly, from the viewpoint of noise reduction performance, the maximum value of the groove width W3 (FIG. 2) of the auxiliary groove 211 of the resonator 21 is preferably 15% or more of the maximum value of the groove depth D1 (FIG. 3) of the first circumferential main groove 11.

The groove width W3 of the auxiliary groove 211 may vary along an extending direction of the auxiliary groove 211, as in the example of FIG. 2, or may be constant along the extending direction of the auxiliary groove 211.

Here, the "maximum value of the groove width (W3) of the auxiliary groove (211)" refers to a groove width (W3) at a portion at which the groove width (W3) of the auxiliary groove (211) is maximized.

Here, the groove width W3 of the auxiliary groove 211 is measured perpendicularly to a groove width centerline 211c of the auxiliary groove 211.

In the tire according to each example described in this specification, a minimum value of the groove depth D3 (FIG. 3) of the auxiliary groove 211 of the resonator 21 is preferably 5.0 mm or more, and more preferably 5.5 mm or more. Therefore, deepening the groove depth D3 of the auxiliary groove 211 increases the volume of the auxiliary groove 211, and thus improves the noise reduction performance of the resonator 21 (and thereby suppresses noise increase). This is particularly preferable in a case in which the groove width W3 (FIG. 2) of the auxiliary groove 211 is narrowed as described above.

Similarly, from the viewpoint of noise reduction performance, the minimum value of the groove depth D3 (FIG. 3) of the auxiliary groove 211 of the resonator 21 is preferably 70% or more of the maximum value of the groove depth D1 (FIG. 3) of the first circumferential main groove 11.

On the other hand, in the tire according to each example described in this specification, the maximum value of the groove depth D3 (FIG. 3) of the auxiliary groove 211 of the resonator 21 is preferably 6.5 mm or less. Thereby, it is possible to suppress reduction in the rigidity of the tread portion 90 (in particular, the intermediate land portion 20), which can be caused by the provision of the resonators 21.

Similarly, from the viewpoint of the rigidity, the maximum value of the groove depth D3 (FIG. 3) of the auxiliary groove 211 of the resonator 21 is preferably 100% or less of the maximum value of the groove depth D1 (FIG. 3) of the first circumferential main groove 11.

The groove depth D3 of the auxiliary groove 211 may be constant along the extending direction of the auxiliary groove 211, or may vary along the extending direction of the auxiliary groove 211.

Here, the "minimum value of the groove width (W3) of the auxiliary groove (211)" refers to a groove depth (D3) at a portion at which the groove depth (D3) of the auxiliary groove (211) is minimized. The "maximum value of the groove width (W3) of the auxiliary groove (211)" refers to a groove depth (D3) at a portion at which the groove depth (D3) of the auxiliary groove (211) is maximized. The "extending direction of the auxiliary groove (211)" is an extending direction of the groove width centerline (211c) of the auxiliary groove (211).

In the tire according to each example described in this specification, a minimum value of the groove depth D2 (FIG. 3) of the branch groove 212 of the resonator 21 is preferably 70% or more of the groove depth D1 of the first circumferential main groove 11. Therefore, by deepening the groove depth D2 of the branch groove 212, wear of the tread portion 90 (in particular, a block portion 20b of the intermediate land portion 20) can be reduced. In addition, in a case in which the circumferential main grooves 10 are made shallow and thus the thickness T1 of the tread rubber 80 is made thinner, as described above, the rigidity of the tread portion 90 tends to increase. Therefore, deepening the groove depth D2 of the branch grooves 212 in this manner can effectively reduce wear, while ensuring sufficient rigidity.

On the other hand, in the tire according to each example described in this specification, the maximum value of the groove depth D2 (FIG. 3) of the branch groove 212 of the resonator 21 is preferably 100% or less of the groove depth D1 of the first circumferential main groove 11. This allows increase in rigidity.

The groove depth D2 of the branch groove 212 may be constant along an extending direction of the branch groove 212, or may vary along the extending direction of the branch groove 212.

Here, the "minimum value of the groove depth (D2) of the branch groove (212)" refers to a groove depth (D2) at a portion at which the groove depth (D2) of the branch groove (212) is minimized. The "maximum value of the groove depth (D2) of the branch groove (212)" refers to a groove depth (D2) at a portion at which the groove depth (D2) of the branch groove (212) is maximized. The "extending direction of the branch groove (212)" is an extending direction of a groove width centerline of the branch groove (212).

In the tire according to each example described in this specification, as in the example of FIG. 1, the auxiliary groove 211 of the resonator 21 may have a first auxiliary groove portion 2111, which extends to the first tire circumferential side CD1 as being gradually far from the first circumferential main groove 11, and a second auxiliary groove portion 2112, which is continuous from an end of the first auxiliary groove portion 2111 on a side close to the first circumferential main groove 11, of both ends of the first auxiliary groove portion 2111 in the extending direction, and extends to the second tire circumferential side CD2. In this case, an acute angle-side inclination angle θ6 (FIG. 2) at an end of the second auxiliary groove portion 2112, on a side connecting to the first auxiliary groove portion 2111, with respect to the tire width direction is preferably larger than an acute angle-side inclination angle θ4 (FIG. 2) at an end of the first auxiliary groove portion 2111, on a side connecting to the second auxiliary groove portion 2112, with respect to the tire width direction. The provision of the second auxiliary groove portion 2112, in addition to the first auxiliary groove portion 2111, in the auxiliary groove 211 makes it possible to increase in the overall length of the auxiliary groove 211. This allows the volume of the auxiliary groove 211 to be increased, which thus improves the noise reduction performance of the resonator 21. In addition, the second auxiliary groove portion 2112 can reduce compression rigidity.

The second auxiliary groove portion 2112 preferably extends to the second tire circumferential side CD2, as being gradually close to the first circumferential main groove 11, as in the example in FIG. 2. However, the second auxiliary groove portion 2112 may extend to the second tire circumferential side CD2 while extending in parallel with the first circumferential main groove 11, or the second auxiliary groove portion 2112 may extend to the second tire circumferential side CD2 as being gradually far from the first circumferential main groove 11.

However, the auxiliary groove 211 may have only the first auxiliary groove portion 2111, without having the second auxiliary groove portion 2112.

In the tire according to each example described in this specification, the acute angle-side inclination angle θ6 (FIG. 2) at an end of the second auxiliary groove portion 2112 of the auxiliary groove 211 of the resonator 21, on the side connecting to the first auxiliary groove portion 2111, with respect to the tire width direction is preferably 1.0 to 5.0 times the acute angle-side inclination angle θ4 (FIG. 2) at the end of the first auxiliary groove portion 2111 of the auxiliary groove 211 of the resonator 21, on the side connecting to the second auxiliary groove portion 2112, with respect to the tire width direction.

In the tire according to each example described in this specification, an acute angle-side inclination angle θ5 (FIG. 2) at an end of the second auxiliary groove portion 2112 of the auxiliary groove 211 of the resonator 21, on the side terminating within the intermediate land portion 20, with respect to the tire width direction is preferably 0.9 to 1.1 times the acute angle-side inclination angle θ6 (FIG. 2) at the end of the second auxiliary groove portion 2112, on the side connecting to the first auxiliary groove portion 2111, with respect to the tire width direction.

In the tire according to each example described in this specification, it is preferable that the groove width of the first auxiliary groove portion 2111 of the auxiliary groove 211 of the resonator 21 gradually decrease toward the first tire circumferential side CD1, as in the example of FIG. 1.

In the tire according to each example described in this specification, it is preferable that the groove width of the second auxiliary groove portion 2112 of the auxiliary groove 211 of the resonator 21 gradually decrease toward the second tire circumferential side CD2, as in the example of FIG. 1.

In the tire according to each example described in this specification, an acute angle-side inclination angle θ1 (FIG. 2) at an end of the branch groove 212 of the resonator 21, on the side open to the first circumferential main groove 11 (more specifically, an end located at the boundary between the intermediate land portion 20 and the first circumferential main groove 11), with respect to the tire width direction is preferably 200 or more. Thereby, the rigidity of a corner portion 20c of the block portion 20b, which is partitioned between the branch groove 212 and the first circumferential main groove 11, of the intermediate land portion 20 is sufficiently enhanced, and the corner portion 20c can be prevented from coming off.

On the other hand, in the tire according to each example described in this specification, the acute angle-side inclination angle θ1 (FIG. 2) at the end of the branch groove 212 of the resonator 21, on the side open to the first circumferential main groove 11, with respect to the tire width direction is preferably 60° or less, and more preferably 450 or less. This makes it possible to provide a sufficient length L3 of the branch groove 212, which thus improves the noise reduction performance of the resonator 21.

In the tire according to each example described in this specification, an acute angle-side inclination angle θ2 (FIG. 2) at an end of the branch groove 212 of the resonator 21, on a side far from the first circumferential main groove 11, with respect to the tire width direction is preferably 20° or more.

On the other hand, in the tire according to each example described in this specification, the acute angle-side inclination angle θ2 (FIG. 2) at the end of the branch groove 212 of the resonator 21, on the side far from the first circumferential main groove 11, with respect to the tire width direction is preferably 60° or less, and more preferably 450 or less.

In the tire according to each example described in this specification, the acute angle-side inclination angle of the branch groove 212 of the resonator 21 with respect to the tire width direction may be constant along the tire width direction, as in the example of FIG. 2, or the acute angle-side inclination angle with respect to the tire width direction may gradually increase, as being gradually far from the first circumferential main groove 11.

In the tire according to each example described in this specification, an acute angle-side inclination angle θ3 (FIG. 2) at an end of the auxiliary groove 211 of the resonator 21, on a side far from the first circumferential main groove 11, with respect to the tire width direction is preferably larger than the acute angle-side inclination angle θ1 (FIG. 2) at the end of the branch groove 212 of the resonator 21, on the side open to the first circumferential main groove 11, with respect to the tire width direction.

This allows increase in the length of the auxiliary groove 211 (specifically, the length L1 of the first auxiliary groove portion 2111), while ensuring the sufficient rigidity of the corner portion 20c of the block portion 20b partitioned between the branch groove 212 and the first circumferential main groove 11, which thus improves the noise reduction performance of the resonator 21.

From the same viewpoint, the acute angle-side inclination angle θ3 (FIG. 2) at the end of the auxiliary groove 211 of the resonator 21, on the side far from the first circumferential main groove 11, with respect to the tire width direction is preferably 45° or more and 800 or less.

However, the inclination angle θ3 may be the same as the inclination angle θ1.

In the tire according to each example described in this specification, it is preferable that, as in the example of FIG. 2, the acute angle-side inclination angle of the first auxiliary groove portion 2111 of the auxiliary groove 211 of the resonator 21 with respect to the tire width direction gradually increase, as being far from the first circumferential main groove 11.

This allows increase in the length of the auxiliary groove 211 (specifically, the length L1 of the first auxiliary groove portion 2111), while ensuring the sufficient rigidity of the corner portion 20c of the block portion 20b partitioned between the branch groove 212 and the first circumferential main groove 11, which thus improves the noise reduction performance of the resonator 21.

From the same viewpoint, in the tire according to the each example described in this specification, it is preferable that, as in the example of FIG. 2, the first auxiliary groove portion 2111 of the auxiliary groove 211 of the resonator 21 be convexly curved to the second tire circumferential side CD2.

However, the acute angle-side inclination angle of the first auxiliary groove portion 2111 of the auxiliary groove 211 of the resonator 21 with respect to the tire width direction may be constant and linearly extend along the tire width direction.

In the tire according to each example described in this specification, the acute angle-side inclination angle θ4 (FIG. 2) at the end of the first auxiliary groove portion 2111 of the auxiliary groove 211 of the resonator 21, on the side connecting to the second auxiliary groove portion 2112, with respect to the tire width direction is preferably 0.9 to 1.1 times the acute angle-side inclination angle θ2 (FIG. 2) at the end of the branch groove 212 of the resonator 21, on the side far from the first circumferential main groove 11, with respect to the tire width direction.

In the tire according to each example described in this specification, the length L1 of the first auxiliary groove portion 2111 of the auxiliary groove 211 of the resonator 21 is preferably 2.0 or more times the length L2 of the second auxiliary groove portion 2112 of the auxiliary groove 211 of the resonator 21. This allows the overall length of the auxiliary groove 211 (in particular, the length L1 of the first auxiliary groove portion 2111) to be lengthened, which thus increases the volume of the auxiliary groove 211 and improves the noise reduction performance of the resonator 21.

On the other hand, in the tire according to each example described in this specification, the length L1 of the first auxiliary groove portion 2111 of the auxiliary groove 211 of the resonator 21 is preferably 8.0 or less times the length L2 of the second auxiliary groove portion 2112 of the auxiliary groove 211 of the resonator 21, and more preferably 7.0 or less times the length L2 of the second auxiliary groove portion 2112 of the auxiliary groove 211 of the resonator 21. Thereby, reduction in rigidity of the intermediate land portion 20 can be suppressed.

The "length (L1) of the first auxiliary groove portion (2111)" refers to the length of the groove width centerline (211c) of the first auxiliary groove portion (2111). The "length (L2) of the second auxiliary groove portion (2112)" refers to the length of the groove width centerline (211c) of the second auxiliary groove portion (2112).

In the tire according to each example described in this specification, the length L1 of the first auxiliary groove portion 2111 of the auxiliary groove 211 of the resonator 21 is preferably 10 to 40% of the ground contact width TW.

Thereby, the length of the auxiliary groove 211 (in particular, the length L1 of the first auxiliary groove portion 2111) can be lengthened and rigidity can be enhanced.

From the same viewpoint, the length L1 of the first auxiliary groove portion 2111 of the auxiliary groove 211 of the resonator 21 is preferably 15 to 40 mm.

In the tire according to each example described in this specification, the length L1 of the first auxiliary groove portion 2111 of the auxiliary groove 211 of the resonator 21 is preferably 1.0 to 5.0 times the length L3 of the branch groove 212 of the resonator 21.

Thereby, rigidity is enhanced while noise is further suppressed.

From the same viewpoint, the length L3 of the branch groove 212 of the resonator 21 is preferably 1 to 30% of the ground contact width TW.

From the same viewpoint, the length L3 of the branch groove 212 of the resonator 21 is preferably 3 to 40 mm.

The "length (L3) of the branch groove (212)" refers to the length of a groove width centerline of the branch groove (212).

In the tire according to each example described in this specification, the volume of the auxiliary groove 211 of the resonator 21 is preferably 150 to 500 mm$^3$.

Thereby, rigidity is enhanced while noise is further suppressed.

In the tire according to each example described in this specification, as in the example of FIG. 2, the branch groove 212 of the resonator 21 is preferably connected to a connecting portion between the first auxiliary groove portion 2111 and the second auxiliary groove portion 2112 in the auxiliary groove 211 of the resonator 21.

Thereby, air entering the branch groove 212 from the first circumferential main groove 11 can smoothly get into the auxiliary groove 211, so noise can be further suppressed.

However, the branch groove 212 of the resonator 21 may be connected to any portion of the auxiliary groove 211 of the resonator 21.

In a case in which the auxiliary groove 211 has only the first auxiliary groove portion 2111, without having the second auxiliary groove portion 2112, the branch groove 212 is preferably connected to the end of the first auxiliary groove portion 2111 on the side close to the first circumferential main groove 11.

In the tire according to each example described in this specification, as illustrated in FIG. 4, the branch groove 212 of the resonator 21 preferably includes a tread surface-side sipe portion 2121, which is open to the tread surface 1 and extends inward in the tire radial direction, and a tunnel portion 2122, which extends continuously from the tread surface-side sipe portion 2121 inward in the tire radial direction and has a larger groove width than the tread surface-side sipe portion 2121.

Since the branch groove 212 has the tread surface-side sipe portion 2121 outside in the tire radial direction, the block portion 20b partitioned between the pair of branch grooves 212 adjacent in the tire circumferential direction, of the intermediate land portion 20, is prevented from collapsing when the tire is rolling. Since the branch groove 212 has the tunnel portion 2122 inside in the tire radial direction, it is possible to provide a passage of air to the resonator 21 and thus improve the noise reduction performance of the resonator 21.

In this way, it is possible to prevent reduction in rigidity owing to the provision of the resonators, while noise is suppressed.

From the viewpoint of preventing the intermediate land portion 20 from collapsing during rolling of the tire, the groove width (sipe width) of the tread surface-side sipe portion 2121 is preferably 0.5 mm or less.

Similarly, from the viewpoint of preventing the intermediate land portion 20 from collapsing during rolling of the tire, the tread surface-side sipe portion 2121 is preferably configured to close (a pair of sipe walls opposite each other contact at least partially) directly under a load, when the tire is mounted on the rim, filled with the above-described specified internal pressure, and under the maximum load.

From the viewpoint of providing the passage of air to the resonator 21 during rolling of the tire, the groove width of the tunnel portion 2122 is preferably 0.8 mm or more.

Similarly, from the viewpoint of providing the passage of air to the resonator 21 during rolling of the tire, the tunnel portion 2122 is preferably configured not to close (the pair of sipe walls opposite each other do not contact at any part) directly under a load, when the tire is mounted on the rim, filled with the above-described specified internal pressure, and under the maximum load.

On the other hand, from the viewpoint of improving the noise reduction performance of the resonator 21, the groove width of the tunnel portion 2122 is preferably 1.5 mm or less.

In the tire according to each example described in this specification, in a case in which the branch groove 212 of the resonator 21 has the tread surface-side sipe portion 2121 and the tunnel portion 2122, as described above, the branch groove 212 of the resonator 21 preferably further includes a bottom-side sipe portion 2123, which extends continuously from the tunnel portion 2122 inward in the tire radial direction and has a smaller groove width than the tunnel portion 2122. This improves the noise reduction performance of the resonator 21.

In this case, the groove width (sipe width) of the bottom-side sipe portion 2123 is preferably the same as the groove width (sipe width) of the tread surface-side sipe portion 2121.

In the tire according to each example described in this specification, as in the example illustrated in FIGS. 3 and 4, groove walls 10a of each of the circumferential main grooves 10 (in the example of the drawings, the first and second circumferential main grooves 11 and 12) are preferably convexly curved inward in the tire radial direction and outward in the groove width direction. In other words, the groove walls 10a of each of the circumferential main grooves 10 (in the example of the drawings, the first and second circumferential main grooves 11 and 12) are rounded.

As illustrated in FIG. 4, the branch groove 212 of the resonator 21 preferably extends to the groove wall 10a of the first circumferential main groove 11. The branch groove 212 preferably extends to the rounded groove wall 10a of the first circumferential main groove 11. In this case, a portion of the branch groove 212 that extends along the groove wall 10a of the first circumferential main groove 11 constitutes an opening extended portion 212a.

Therefore, by forming the branch groove 212 deeper, wear of the tread portion 90 (in particular, the block portion 20b of the intermediate land portion 20) can be reduced. In addition, in a case in which the circumferential main grooves 10 are made shallow and thus the thickness T1 of the tread rubber 80 is made thinner, as described above, the rigidity of the tread portion 90 tends to increase. Therefore, forming the branch grooves 212 deeper, in this manner, can effectively reduce wear, while ensuring sufficient rigidity.

The opening extended portion 212a allows air in the first circumferential main groove 11 to easily get into the branch groove 212, which thus improves the noise reduction performance of the resonator 21. Therefore, noise can be further suppressed.

Here, "outward in the groove width direction" refers to a side far from the groove width centerline.

In the cross-section in the tire width direction (FIG. 3), the radius of curvature R of the groove walls 10a of each of the circumferential main grooves 10 (in the example of the drawings, the first and second circumferential main grooves 11 and 12) is preferably 2.0 to 4.5 mm.

As in the example of FIG. 3, an inner end of the opening extended portion 212a of the branch groove 212 in the tire radial direction is preferably positioned inside in the tire radial direction, with respect to a center of the first circumferential main groove 11 in a groove depth direction (a center between an opening end surface of the first circumferential main groove 11 open to the tread surface 1 and a groove bottom of the first circumferential main groove 11), and more preferably situated at the same position as the groove bottom of the first circumferential main groove 11 in the tire radial direction.

As in the example of FIG. 4, the branch groove 212 (specifically, the opening extended portion 212a of the branch groove 212) preferably terminates at the vicinity of the boundary between the groove wall 10a and the groove bottom of the first circumferential main groove 11.

In the tire according to each example described in this specification, as in the example illustrated in FIG. 4, the tunnel portion 2122 of the branch groove 212 of the resonator 21 is preferably open to the groove wall 10a (rounded groove wall 10a) of the first circumferential main groove 11. This allows air in the first circumferential main groove 11 to easily get into the branch groove 212, which thus improves the noise reduction performance of the resonator 21. Therefore, noise can be further suppressed.

In the tire according to each example described in this specification, a pitch P1 (FIG. 1) between the branch grooves 212 of the resonators 21 in the tire circumferential direction is preferably 2.5 or more times the groove depth D2 (FIG. 3) of the branch grooves 212. Thereby, reduction in rigidity, owing to the provision of the resonators 21, can be prevented.

On the other hand, in the tire according to each example described in this specification, the pitch P1 (FIG. 1) between the branch grooves 212 of the resonators 21 in the tire circumferential direction is preferably 5.0 or less times the groove depth D2 (FIG. 3) the branch grooves 212. Thereby, wear of the tread portion 90 (in particular, the intermediate land portion 20) can be prevented.

In the tire according to each example described in this specification, the width W1 of the intermediate land portion 20 is preferably 30 to 50% of the ground contact width TW of the tire. Thereby, reduction in rigidity, owing to the provision of the resonators, can be prevented.

Similarly, in the tire according to each example described in this specification, the width W1 of the intermediate land portion 20 is preferably 40 to 75 mm.

In the tire according to each example described in this specification, the intermediate land portion 20 is preferably provided with a plurality of intermediate land sipes 22 each of whose one end is open to the second circumferential main groove 12 and the other end terminates within the intermediate land portion 20. Thereby, wear of the tread portion 90 (in particular, the intermediate land portion 20) can be prevented.

As in the example of FIG. 1, each of the intermediate land sipes 22 preferably extends gradually to the second tire circumferential side CD2, as being far from the second circumferential main groove 12.

As in the example of FIG. 1, each of the intermediate land sipes 22 preferably terminates before the tire equatorial plane CL.

Each of the intermediate land sipes 22 is preferably configured to close (a pair of sipe walls opposite each other contact at least partially) directly under a load, when the tire is mounted on the rim, filled with the above-described specified internal pressure, and under the maximum load.

A pitch P2 (FIG. 1) between the intermediate land sipes 22 in the tire circumferential direction is preferably 0.9 to 1.5 times the pitch P1 (FIG. 1) between the branch grooves 212 of the resonators 21 in the tire circumferential direction.

In the tire according to each example described in this specification, the first end land portion 30 is preferably provided with a plurality of first end land portion lug grooves 31 each of whose one end is open to the first ground contact edge TE1 and the other end terminates within the first end land portion 30. This improves drainage while enhancing rigidity.

As in the example of FIG. 1, each of the first end land portion lug grooves 31 preferably extends gradually to the first tire circumferential side CD1, as being far from the first ground contact edge TE1.

The groove width of each of the first end land portion lug grooves 31 is preferably 1.5 to 4.5 mm, for example.

A pitch P3 (FIG. 1) between the first end land portion lug grooves 31 in the tire circumferential direction is preferably 0.4 to 1.0 times the pitch P1 (FIG. 1) of the branch grooves 212 of the resonators 21 in the tire circumferential direction.

In the tire according to each example described in this specification, the second end land portion 40 is preferably provided with a plurality of second end land portion lug grooves 42 each of whose one end is open to the second ground contact edge TE2 and the other end terminates within the second end land portion 40. This improves drainage while enhancing rigidity.

As in the example of FIG. 1, each of the second end land portion lug grooves 42 preferably extends gradually to the second tire circumferential side CD2, as being far from the second ground contact edge TE2.

The groove width of each of the second end land portion lug grooves 42 is preferably 1.5 to 4.5 mm, for example.

A pitch P4 (FIG. 1) between the second end land portion lug grooves 42 in the tire circumferential direction is preferably 0.4 to 1.0 times the pitch P1 (FIG. 1) of the branch grooves 212 of the resonators 21 in the tire circumferential direction.

In the tire according to each example described in this specification, in a case in which the second end land portion 40 is provided with the second end land portion lug grooves 42, as described above, the second end land portion 40 is preferably further provided with a plurality of connecting sipes 43 each of which extends so as to connect between the second end land portion lug groove 42 and the second circumferential main groove 12.

As in the example of FIG. 1, each of the connecting sipes 43 preferably extends gradually to the second tire circumferential side CD2, as being far from the second ground contact edge TE2.

Although not illustrated in the drawings, each of the connecting sipes 43 preferably has a tread surface-side sipe portion, which is open to the tread surface 1 and extends inward in the tire radial direction, and a tunnel portion, which extends continuously from the tread surface-side sipe portion inward in the tire radial direction and has a larger groove width than the tread surface-side sipe portion, just as with the branch groove 212 of the resonator 21. Thereby, air in the second circumferential main groove 12 can get into the second end land portion lug grooves 42 through the tunnel portions of the connecting sipes 43, so noise can be reduced. In this case, the tread surface-side sipe portion is preferably configured to close (a pair of sipe walls opposite each other contact at least partially) directly under a load, when the tire is mounted on the rim, filled with the above-described specified internal pressure, and under the maximum load.

In the tire according to each example described in this specification, in a case in which the second end land portion 40 is provide with the second end land portion lug grooves 42, as described above, the second end land portion 40 is preferably further provided with a plurality of second end land portion sipes 41 each of whose one end is open to the second ground contact edge TE2 and the other end is open to the second circumferential main groove 12, between a pair of the second end land portion lug grooves 42 adjacent to each other in the tire circumferential direction.

As in the example of FIG. 1, each of the second end land portion sipes 41 preferably extends gradually to the second tire circumferential side CD2, as being far from the second ground contact edge TE2.

In the tire according to each example described in this specification, the resonators 21 may be disposed only on one side with respect to the tire equatorial plane CL. In this case, the resonators 21 may be disposed only on the vehicle-mounted outside (OUT side), as in the example of FIG. 1, or only on the vehicle-mounted inside (IN side) with respect to the tire equatorial plane CL.

Alternatively, the resonators 21 may be disposed on the tire equatorial plane CL.

Alternatively, as in a first variation illustrated in FIG. 5, the resonators 21 may be disposed on both sides with respect to the tire equatorial plane CL. In this case, in each of the resonators 21 that are located on the side of the second circumferential main groove 12 with respect to the tire equatorial plane CL, both ends of the auxiliary groove 211 terminate within the intermediate land portion 20, the branch groove 212 extends so as to connect between the auxiliary groove 211 and the second circumferential main groove 12, and the branch groove 212 has a smaller groove cross-sectional area than the auxiliary groove 211.

In the tire according to each example described in this specification, the intermediate land portion 20 is preferably located on the tire equatorial plane CL. This allows more effective reduction in noise.

In the tire according to each example described in this specification, as in a second variation illustrated in FIG. 6, the intermediate land portion 20 may be provided with a narrow groove 23 on the tire equatorial plane CL. In this case, drainage can be improved.

However, the tire without the narrow groove 23, as in the example of FIG. 1, has the intermediate land portion 20 with improved rigidity.

In the case of providing the narrow groove 23, the groove width of the narrow groove 23 is preferably 4% or less of the ground contact width TW.

The groove depth of the narrow groove 23 is preferably 75% or less of the groove depth D1 (FIG. 3) of each of the circumferential main grooves 10 (in the example of the drawings, the first and second circumferential main grooves 11 and 12), and more preferably 50% or less.

In the tire according to each example described in this specification, the negative ratio of the tread surface 1 is preferably 25 to 30%, and more preferably 25 to 29%.

This allows sufficient drainage while preventing reduction in rigidity owing to the provision of the resonators 21.

In this specification, the "negative ratio of the tread surface (1)" means the ratio of the area of a part of the tread surface (1) that does not contact a road surface to the total area of the tread surface (1), when the tire is mounted on the rim, filled with an internal pressure of the tire of 250 kPa, and under a load of 4.17 kN applied to the tire. The "part of the tread surface (1) that does not contact a road surface" is constituted of various types of grooves and the like in the tread surface (1).

INDUSTRIAL APPLICABILITY

The tire according to the present disclosure can be used as any type of pneumatic tire, but is suitably used as a pneumatic tire for passenger vehicles.

REFERENCE SIGNS LIST 1 tread surface
10 circumferential main groove
10a groove wall
11 first circumferential main groove
12 second circumferential main groove
20 intermediate land portion
20b block portion
20c corner portion
21 resonator
211 auxiliary groove
211c groove width centerline
2111 first auxiliary groove portion
2112 second auxiliary groove portion
212 branch groove
2121 tread surface-side sipe portion
2122 tunnel portion
2123 bottom-side sipe portion
212a opening extended portion
22 intermediate land sipe
23 narrow groove
30 first end land portion
31 first end land portion lug groove
40 second end land portion
41 second end land portion sipe
42 second end land portion lug groove
43 connecting sipe
60 belt
61 belt layer
70 carcass
80 tread rubber
90 tread portion
TE1 first ground contact edge (ground contact edge)
TE2 second ground contact edge (ground contact edge)
CD1 first tire circumferential side
CD2 second tire circumferential side
CL tire equatorial plane

The invention claimed is:

1. A tire comprising a first circumferential main groove and a second circumferential main groove in a tread surface, wherein
a resonator is formed in an intermediate land portion partitioned between the first circumferential main groove and the second circumferential main groove,
the resonator comprises: an auxiliary groove whose both ends terminate within the intermediate land portion; and a branch groove extending so as to connect between the auxiliary groove and the first circumferential main groove, the branch groove having a smaller groove cross-sectional area than the auxiliary groove,
groove depths D1 of the first and second circumferential main grooves are 50% or less of groove widths W2 of the first and second circumferential main grooves, respectively, a groove depth D3 of the auxiliary groove of the resonator is 70% or more of the groove depth D1 of the first circumferential main groove, the auxiliary groove of the resonator comprises:
  a first auxiliary groove portion extending toward a first side in a tire circumferential direction, as being gradually farther from the first circumferential main groove; and
  a second auxiliary groove portion extending from an end of the first auxiliary groove portion in the tire width direction on a side close to the first circumferential main groove and toward a second side opposite to the first side in the tire circumferential direction, as being gradually closer to the first circumferential main groove, an acute angle-side inclination angle θ6 at an end of the second auxiliary groove portion, on a side connecting to the first auxiliary groove portion, with respect to a tire width direction is larger than an acute angle-side inclination angle θ4 at an end of the first auxiliary groove portion, on a side connecting to the second auxiliary groove portion, with respect to the tire width direction, the branch groove of the resonator is connected to a connecting portion between the first auxiliary groove portion and the second auxiliary groove portion in the auxiliary groove of the resonator, and the acute angle-side inclination angle θ6 is larger than an acute angle-side inclination angle θ2 at the end of the branch groove of the resonator, on a side far from the first circumferential main groove, with respect to the tire width direction.

2. The tire according to claim 1, wherein the groove depth D1 of each of the first and second circumferential main grooves is 6.5 mm or less.

3. The tire according to claim 1, wherein the groove depth D3 of the auxiliary groove of the resonator is 5.5 mm or more.

4. The tire according to claim 1, wherein
a groove depth D2 of the branch groove of the resonator is 70% or more of the groove depth D1 of the first circumferential main groove.

5. The tire according to claim 1, wherein a groove width W3 of the auxiliary groove of the resonator is 60% or less of the groove depth D3 of the auxiliary groove.

6. The tire according to claim 1, wherein
the branch groove of the resonator extends to a groove wall of the first circumferential main groove.

7. The tire according to claim 6, wherein the groove wall of the first circumferential main groove is convexly curved inward in a tire radial direction and outward in a groove width direction.

8. The tire according to claim 6, wherein the branch groove of the resonator terminates at a vicinity of a boundary between the groove wall and a groove bottom of the first circumferential main groove.

9. The tire according to claim 1, wherein the groove width W2 of each of the first and second circumferential main grooves is 5 to 15% of a ground contact width TW of the tire.

10. The tire according to claim 1, wherein
an acute angle-side inclination angle θ1 at an end of the branch groove of the resonator, on a side open to the first circumferential main groove, with respect to a tire width direction is 20 to 60°.

11. The tire according to claim 1, wherein
an acute angle-side inclination angle θ3 at an end of the auxiliary groove of the resonator, on a side far from the first circumferential main groove, with respect to a tire width direction is larger than an acute angle-side inclination angle θ1 at an end of the branch groove of the resonator, on a side open to the first circumferential main groove, with respect to the tire width direction.

12. The tire according to claim 1, wherein an acute angle-side inclination angle of the first auxiliary groove portion of the auxiliary groove of the resonator with respect to a tire width direction gradually increases, as being far from the first circumferential main groove.

13. The tire according to claim 1, wherein a length L1 of the first auxiliary groove portion of the auxiliary groove of the resonator is 2.0 to 7.0 times a length L2 of the second auxiliary groove portion of the auxiliary groove of the resonator.

14. The tire according to claim 1, wherein
a pitch P1 between the branch grooves of the resonators in the tire circumferential direction is 2.5 to 5.0 times a groove depth D2 of the branch groove.

15. The tire according to claim 1, wherein
the branch groove of the resonator comprises:
  a tread surface-side sipe portion being open to the tread surface, the tread surface-side sipe portion extending inward in a tire radial direction; and
  a tunnel portion extending continuously from the tread surface-side sipe portion inward in the tire radial direction, the tunnel portion having a larger groove width than the tread surface-side sipe portion.

16. The tire according to claim 1, wherein the resonator is disposed only on one side with respect to a tire equatorial plane.

17. The tire according to claim 1, wherein a width W1 of the intermediate land portion is 30 to 50% of a ground contact width TW of the tire.

18. The tire according to claim 1, wherein a negative ratio of the tread surface is 25 to 30%.

19. The tire according to claim 1, wherein a maximum value of a thickness T1 of tread rubber is 8 mm or less.

20. The tire according to claim 1, wherein
the intermediate land portion is located on a tire equatorial plane, and
the intermediate land portion is provided with a narrow groove on the tire equatorial plane.

21. The tire according to claim 1, wherein
a groove wall of the first circumferential main groove is convexly curved inward in a tire radial direction and outward in a groove width direction, and
the branch groove of the resonator extends to the groove wall of the first circumferential main groove.

22. The tire according to claim 15, wherein the tunnel portion of the branch groove of the resonator is open to a groove wall of the first circumferential main groove.

23. The tire according to claim 1, wherein
an acute angle-side inclination angle of the first auxiliary groove portion of the auxiliary groove of the resonator with respect to the tire width direction gradually increases, as being far from the first circumferential main groove, and
a groove width centerline of the second auxiliary groove portion extends substantially linearly.

* * * * *